(12) United States Patent
Alexander (10) Patent No.: US 7,987,173 B2
(45) Date of Patent: Jul. 26, 2011

(54) SYSTEMS AND METHODS OF HANDLING INTERNET SPIDERS

(75) Inventor: James Alexander, Mount Kisco, NY (US)

(73) Assignee: Vizibility Inc., New York, NY (US)

( * ) Notice: Subject to any disclaimer, the term of this patent is extended or adjusted under 35 U.S.C. 154(b) by 0 days.

(21) Appl. No.: 12/847,077

(22) Filed: Jul. 30, 2010

(65) Prior Publication Data
US 2011/0055400 A1    Mar. 3, 2011

Related U.S. Application Data

(63) Continuation-in-part of application No. 12/795,034, filed on Jun. 7, 2010, now Pat. No. 7,831,609.

(60) Provisional application No. 61/236,630, filed on Aug. 25, 2009, provisional application No. 61/348,558, filed on May 26, 2010, provisional application No. 61/350,712, filed on Jun. 2, 2010.

(51) Int. Cl.
*G06F 7/00* (2006.01)
(52) U.S. Cl. ........................ 707/709; 709/225
(58) Field of Classification Search ............ 709/224, 709/225, 229; 707/709
See application file for complete search history.

(56) References Cited

U.S. PATENT DOCUMENTS

| | | | |
|---|---|---|---|
| 6,662,230 B1 * | 12/2003 | Eichstaedt et al. | 709/229 |
| 2004/0025055 A1 * | 2/2004 | Hamadi et al. | 713/201 |
| 2005/0188215 A1 | 8/2005 | Shulman et al. | |
| 2006/0248452 A1 | 11/2006 | Lambert et al. | |
| 2006/0256729 A1 | 11/2006 | Chen et al. | |
| 2007/0078983 A1 | 4/2007 | Modrall | |

(Continued)

FOREIGN PATENT DOCUMENTS
WO    2004/070509 A2    8/2004

OTHER PUBLICATIONS

Shaozhi Ye, Guohan Lu and Xing Li, "Workload-Aware Web Crawling and Server Workload Detection," In Proceedings of the second Asia-Pacific Advanced Network Research Workshop, pp. 263-269, Jul. 2004, Cairns, Australia (Available online at http://wwwcsif.cs.ucdavis.edu/~yeshao/papers/apan04.pdf, last visited May 11, 2010).

(Continued)

*Primary Examiner* — Cheyne Ly
(74) *Attorney, Agent, or Firm* — Michael S. Garrabrants; Novak Druce + Quigg LLP (57) ABSTRACT

Aspects relate to identifying Internet spiders with an approach involving a plurality of instances of one or more URLs, which reference resources available from a first domain. Instances of the URLs are distributed at other Internet domains. Spiders crawling those domains will activate those URL instances, resulting in requests for the resources referenced by the URLs. A generator of a number of requests for the same resource, from a potential multitude of URL instances, can cause the generator to be categorized as a spider. Similarly, a generator of a number of requests for resources identified by different URLs also can be categorized as spider behavior. In some cases, the first domain may not have a browseable site infrastructure with, such that a spider would not readily crawl it by following internal links. The URLs can refer to custom queries created by various users, who can provide the URLs on their pages, such as on social networking sites.

2 Claims, 7 Drawing Sheets

U.S. PATENT DOCUMENTS

2008/0270604 A1 10/2008 Cooper et al.
2009/0327249 A1 12/2009 Pappas
2010/0023751 A1 1/2010 He

OTHER PUBLICATIONS

G. Buehrer, J.W. Stokes, K. Chellapilla, and J.C. Platt, "Classification of Automated Web Traffic," Chapter in Weaving Services and People on the World Wide Web, Springer Verlag, 2007 (Available online at http://research.microsoft.com/pubs/120191/ClassAutoSearchTraffic.pdf, last visited May 11, 2010).
Zhichun Li, Anup Goyal and Yan Chen, "Honeynet-based Botnet Scan Traffic Analysis," invited book chapter for Botnet Detection: Countering the Largest Security Threat, Springer, 2007 (Available online at http://www.cs.northwestern.edu/~ychen/Papers/botnetBook.pdf, last visited May 11, 2010).
Jiang Wang, Anup Ghosh, and Yih Huang, "Web Canary: A Virtualized Web Browser to Support Large-Scale Silent Collaboration in Detecting Malicious Web Sites," Proceedings of the 4th International Conference on Collaborative Computing: Networking, Applications and Worksharing, CollaborateCom 2008, Orlando, FL, USA, Nov. 13-16, 2008 (Available online at http://mason.gmu.edu/~jwanga/Canaries.pdf, last visited May 11, 2010).
Bettina Berendt and Myra Spiliopoulou, "Analysis of navigation behaviour in web sites integrating multiple information systems," The VLDB Journal—The International Journal on Very Large Data Bases, vol. 9, issue 1, 2000, pp. 56-75, Springer-Verlag 2000.
V. Boyapati, K. Chevrier, A. Finkel, N. Glance, T. Pierce, R. Stockton and C. Whitmer, "ChangeDetector™: a Site-Level Monitoring Tool for the WWW," Proceedings of the 11th international conference on World Wide Web, May 7-11, 2002, Honolulu, Hawaii, USA, Session: Description and Analysis, pp. 570-579, ACM, New York, NY, 2002.
J. Cardiff, T. Catarci, M. Passeri, and G. Santucci, Querying Multiple Databases Dynamically on the World Wide Web, Proceedings of the First International Conference on Web Information System Engineering (WISE'00), vol. 1, pp. 238-245, 2000, IEEE Computer Society, Washington, DC, USA.
A. Carlson, J. Betteridge, E.R. Hruschka Jr. and T.M. Mitchell, "Coupling Semi-Supervised Learning of Categories and Relations," Proceedings of the NAACL HLT 2009 Workshop on Semi-supervised Learning for Natural Language Processing, pp. 1-9, Boulder, Colorado, Jun. 2009, Association for Computational Linguistics.
Tiziana Catarci, "Web-Based Information Access," Proceedings of the Fourth IECIS International Conference on Cooperative Information Systems (COOPIS), pp. 10-19, 1999, IEEE Computer Society, Washington, DC, USA.
Fan Chunlong, Yu Zhouhua and Xu Lei, "Detecting Capability Evaluate of Spider Detection Techniques," 2010 2nd International Conference on Computer Engineering and Technology, vol. 7, pp. 268-271, IEEE Computer Society, Washington, DC, USA.
Y. Ding, Q. Li, Z. Yan and Y. Dong, "Web Informative Content Block Detecting Based on Entropy and Parent-Child Relationship in DOM," Proc. of the 2008 IEEE International Conference on Information and Automation (ICIA 2008), Jun. 20-23, 2008, Zhanggjiajie, China, pp. 175-178, IEEE Computer Society, Washington, DC, USA.
Derek Doran and Swapna S. Gokhale, "Discovering New Trends in Web Robot Traffic Through Functional Classification," Proceedings of the 2008 Seventh IEEE International Symposium on Network Computing and Applications (NCA), pp. 275-278, 2008, IEEE Computer Society, Washington, DC, USA.
J.V. Hansen, P.B. Lowry, R.D. Meservy, and D.M. McDonald, "Genetic programming for prevention of cyberterrorism through dynamic and evolving intrusion detection," Decision Support Systems, vol. 43, issue 4, Aug. 2007, pp. 1362-1374, Elsevier Science Publishers B. V., Amsterdam, The Netherlands.
Xiangji Huang, Aijun An and Nick Cercone, "Comparison of Interestingness Functions for Learning Web Usage Patterns," Proc. of the Eleventh International Conference on Information and Knowledge Management (CIKM'02), Nov. 4-9, 2002,McLean, Virginia, USA, pp. 617-620, 2002, ACM, New York, NY.
X. Huang, A. An, N. Cercone and G. Promhouse, "Discovery of Interesting Association Rules from Livelink Web Log Data," Proceedings of the 2002 IEEE International Conference on Data Mining (ICDM), pp. 763-766, 2002, IEEE Computer Society, Washington, DC, USA.
Paul Huntington, David Nicholas and Hamid R. Jamali, "Web robot detection in the scholarly information environment," Journal of Information Science, vol. 34, issue 5, pp. 726-741, 2008, Sage Publications, Inc., Thousand Oaks, CA.
Alpa Jain and Patrick Pantel, "Identifying Comparable Entities on the Web," Proceedings of the 18th ACM Conference on Information and Knowledge Management (CIKM'09), Nov. 2-6, 2009, Hong Kong, China, pp. 1661-1664, 2009, ACM, New York, NY.
Balachander Krishnamurthy and Jia Wang, "On Network-Aware Clustering of Web Clients," ACM SIGCOMM Computer Communication Review, Oct. 2000, Stockholm, Sweden, vol. 30, issue 4, pp. 97-110, 2000, ACM, New York, NY.
S. Lakshminarayana, "Categorization of web pages—Performance enhancement to search engine," Knowledge-Based Systems, vol. 22, issue 1, Jan. 2009, pp. 100-104, 2008, Elsevier Science Publishers B. V. Amsterdam, The Netherlands.
Y. Liu, R. Cen, M. Zhang, S. Ma, and L. Ru, "Identifying Web Spam with User Behavior Analysis," Proc. of the 4th international Workshop on Adversarial Information Retrieval on the Web (AIRWEB'08), Apr. 22, 2008, Beijing, China, vol. 295, pp. 9-16, 2008, ACM, New York, NY.
Análía Lourenço and Orlando Belo, "Catching Web Crawlers in the Act," Proceedings of the 6th international conference on Web Engineering (ICWE'06), Jul. 11-14, 2006, Palo Alto, CA, vol. 263, pp. 265-272, 2006, ACM, New York, NY.
Análía Lourenço, Ronnie Alves, and Orlando Belo, "When the Hunter Becomes the Prey—Tracking down Web Crawlers in Clickstreams," Proc. of the 1st Data Gadgets Workshop, JISBD, 2004 (Available online at http://alfa.di.uminho.pt/~ronnie/files_files/ufr/2004-dataGadgets-v1.pdf, last visited Jul. 29, 2010).
M.R. Meiss, F. Menczer, S. Fortunato, A. Flammini and A. Vespignani, "Ranking Web Sites with Real User Traffic," Proceedings of the international conference on Web Search and Web Data Mining (WSDM'08), Feb. 11-12, 2008, Palo Alto, CA, pp. 65-75, 2008, ACM, New York, NY.
Christopher Olston and Marc Najork, "Web Crawling," Foundations and Trends in Information Retrieval, vol. 4, No. 3, pp. 175-246, 2010, Now Publishers Inc.
Gautam Pant and Padmini Srinivasan, "Learning to Crawl: Comparing Classification Schemes," ACM Transactions on Information Systems (TOIS), vol. 23, issue 4, Oct. 2005, pp. 430-462, 2005, ACM, New York, NY.
K. Park, V.S. Pai, K.W. Lee, and S. Calo, "Securing Web Service by Automatic Robot Detection," USENIX Annual Technical Conference, General Track 2006, pp. 255-260 (Available online at http://nsg.cs.princeton.edu/publication/robot_usenix_06.pdf, last visited Jul. 29, 2010).
Eduarda Mendes Rodrigues, Natasa Milic-Frayling and Blaz Fortuna, "Detection of Web Subsites: Concepts, Algorithms, and Evaluation Issues," Proceedings of the IEEE/WIC/ACM International Conference on Web Intelligence, pp. 66-73, 2007, IEEE Computer Society, Washington, DC, USA.
F. Saint-Jean, A. Johnson, D. Boneh and J. Feigenbaum, "Private Web Search," Proceedings of the 2007 ACM workshop on Privacy in Electronic Society (WPES'07), Oct. 29, 2007, Alexandria, VA, pp. 84-90, 2007, ACM, New York, NY.
Uri Schonfeld, Ziv Bar-Yossef and Idit Keidar, "Do not Crawl in the DUST: Different URLs with Similar Text Extended Abstract," Proceedings of the 15th international conference on World Wide Web (WWW 2006), May 23-26, 2006, Edinburgh, Scotland, pp. 1015-1016, 2006, ACM, New York, NY.
Jaideep Srivastava, "Web Mining: Accomplishments & Future Directions," University of Minnesota, (Available online at http://www.ieee.org.ar/downloads/Srivastava-tut-pres.pdf, last visited Jul. 29, 2010).
Fang Yu, Yinglian Xie and Qifa Ke, "SBotMiner: Large Scale Search Bot Detection," Proceedings of the third ACM international conference on Web Search and Data Mining (WSDM'10), Feb. 4-6, 2010, New York City, New York, pp. 421-430, 2010, ACM, New York, NY.

Athena Stassopoulou and Marios D. Dikaiakos, "Web robot detection: A probabilistic reasoning approach," Computer Networks: The International Journal of Computer and Telecommunications Networking, vol. 53, issue 3, Feb. 2009, pp. 265-278, 2008, Elsevier Science Publishers B. V., Amsterdam, The Netherlands.

Young-Joo Chung, Masashi Toyoda and Masaru Kitsuregawa, "Identifying Spam Link Generators for Monitoring Emerging Web Spam," Proceedings of the 4th workshop on Information Credibility (WICOW'10) Apr. 27, 2010, Raleigh, NC, pp. 51-58, 2010, ACM, New York, NY.

Ziv Bar-Yossef, Idit Keidar and Uri Schonfeld, "Do not Crawl in the DUST: Different URLs with Similar Text," Proceedings of the 16th international conference on World Wide Web (WWW 2007), May 8-12, 2007, Banff, Alberta, Canada, pp. 111-120, 2007, ACM, New York, NY.

Pang-Ning Tan and Vipin Kumar, "Discovery of Web Robot Sessions based on their Navigational Patterns", Data Mining and Knowledge Discovery 6(1) 9-35, 2002, Kluwer Academic Publishers.

M.D. Dikaiakos, A. Stassopoulou and L. Papageorgiou, An investigation of web crawler behavior: characterization and metrics,: Computer Communications 28, 2005, pp. 880-897, Elsevier B.V.

* cited by examiner

SYSTEMS AND METHODS OF HANDLING INTERNET SPIDERS

CROSS REFERENCE TO RELATED APPLICATIONS

This application is a continuation-in-part of U.S. patent application Ser. No. 12/795,034, filed on Jun. 7, 2010, which claims priority from and incorporates U.S. provisional application No. 61/236,630, entitled "SYSTEM AND METHOD FOR SEARCHING, FORMULATING, DISTRIBUTING AND MONITORING USAGE OF PREDEFINED INTERNET SEARCH QUERIES", filed on Aug. 25, 2009, and from U.S. provisional application No. 61/348,558, entitled "SYSTEM AND METHOD FOR SEARCHING, FORMULATING, DISTRIBUTING AND MONITORING USAGE OF PREDEFINED INTERNET SEARCH QUERIES", filed on May 26, 2010; this application also claims priority from and incorporates U.S. provisional application No. 61/350,712, entitled "SYSTEMS AND METHODS OF HANDLING INTERNET SPIDERS," filed on Jun. 2, 2010; all of which are incorporated by reference in their entirety, for all purposes, herein.

BACKGROUND

1. Field

Aspects disclosed herein relate to information searching, and more particularly to systems and methods relating to detecting Internet spiders and web crawlers.

2. Related Art

Internet users are increasingly finding navigating document collections to be difficult because of the increasing size of such collections. Likewise, companies, individuals and other organizations wishing to be found by Internet users face growing challenges with maintaining their online visibility. For example, it is estimated that the World Wide Web on the Internet includes more than 11 billion pages in the publicly indexable Web across more than 110 million web sites. Consequently, finding desired information in such a large collection, unless the identity, location, or characteristics of a specific document or search target are well known, can be much like looking for a needle in a haystack. The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file. URLs can be extremely long, complex strings of machine readable code.

Many documents on the Web are in markup language (e.g., HTML), which allows for formatting to be applied to the document, external content (such as images and other multimedia data types) to be introduced within the document, and "hotlinks" or "links" to other documents to be placed within the document, among other things. "Hotlinking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document. A user cannot be expected to know or remember a URL for each and every document on the Internet, or even URLs for those documents in a smaller collection of preferred documents.

Accordingly, navigation assistance is not only helpful, but important for practical internet usage. Such navigation assistance is typically providing via an Internet based search engine, such as Google®, Microsoft's Bing®, Yahoo!® or the like. Accordingly, when an Internet user desires to find information about a company, individual or organization, the Internet user will frequently turn to a "search engine" to locate the information. A search engine serves as an index into the content stored on the Internet.

"Google" (www.google.com) is an example of a search engine. It operates in a similar manner to traditional keyword-based search engines, in that a search begins by the user's entry of one or more search terms used in a pattern-matching analysis of documents on the Web. It differs from traditional keyword-based search engines in that search results are ranked based on a metric of page "importance," which differs from the number of occurrences of the desired search terms (and simple variations upon that theme). Regardless of the proprietary nature of any given search engines' approach, Internet users searching for companies, individuals or organizations with similar characteristics (i.e. name, industry, etc.) often receive search results that are inaccurate, or relate to entities other than the intended search target. For example, a search for "John Smith", with the intention of obtaining information about a particular person by that name, will return many results about different "John Smith's, such that the desired John Smith may not have any relevant results. In these instances, the Internet user may build more complex search queries to generate more relevant results, which is only possible if the Internet user possesses information that can be used as a basis for such queries.

It is understood and well documented that it is desirable for companies, individuals and organizations to appear early in search results for personal, financial and other reasons. Prominence in search results for a given term or terms in search engines is a form of third party validation, at least in that Internet users place a higher value on entries in top search results because of their perceived relevance, success, and size. Therefore, viewership of search results or click throughs for search results on subsequent results pages declines precipitously.

Search Engine Optimization (SEO) has emerged as a category of services available to operators of web sites. SEO provides for deliberately engineering prominent placement in search results by tailoring web sites to the algorithms employed by a given search engine. In addition to SEO, 'paid search' may be utilized to display an advertisement on the top pages of search results for a given search term(s). SEO, paid search and other optimization strategies are typically only engaged by organizations due to their complexity and cost. Individuals have fewer options to achieve optimal placement in search results.

Google Profiles is one example of a mechanism individuals can utilize to offer information specific to themselves. Google Profiles does not influence search results, however, and individuals with even slightly common names often find themselves in a long list with others, eliminating the value of the feature. SEO, paid search, Google Profiles, and other similar optimization strategies are reactive in that they only influence but do not control what is returned in search results. These strategies are necessary because the natural search behavior of Internet users favors implementation of less sophisticated search queries or the Internet user simply does not possess the information necessary to build a complex search query that will allow the return of appropriately focused results. When companies, individuals or organizations with similar characteristics engage like optimization strategies, however, the differentiation gained from them diminishes and the value declines for them and Internet users alike.

Search engines employ machines (known as spiders or crawlers) that traverse Internet-accessible directories, web pages, and other information in order to determine location, content, and otherwise index resources that are available electronically. One way that machines traverse these electronic resources is by following links from one resource to another. In some cases, it may be desirable to differentiate between requests for resources generated by spiders from requests for resources generated by humans.

When a spider reaches a web site, it "crawls" through the links available at the site, following one link to another. For example, a home page or index can present a page that loads when a top level domain (e.g., www.vizibility.com) is requested, and the content of that page can be crawled by following all the links present on that home page, and continuing to recurse further into subpages until all the linked pages have been viewed by the spider.

As such, a web site can attempt to detect a spider by observing how machine(s) associated with a given IP address interacts with the links on the web site. For example, by detecting how quickly links are requested by the same IP address, non-human site navigation can be inferred. Given the heuristic nature of determining whether a given IP address is used by a spider, or shared by a group of people, or the like, further improvements to spider detection remain desirable.

SUMMARY

An aspect disclosed includes one or more URLs that are located at different locations on a network (e.g., the Internet), and which reference a resource at another domain.

An example aspect includes a computer-implemented method, which comprises providing a plurality of URLs to be provided in content available from a plurality of sources on the Internet. Each of the URLs is resolvable to a resource at a common domain (or at multiple domains that share information about resource access). The method also comprises accepting requests for the URL-located resources and collecting identifying information for entities making the requests. The method also comprises comparing identifying information for entities making the requests. Based on the comparing, the method also comprise identifying an entity making an aberrant number of requests for different URLS of the plurality; and identifying that entity as a web crawler. In some examples, aberrant includes a comparatively high number of requests for the same URL, which can result from a number of instances of that URL being accessed from one or more other locations in the Internet (e.g., 5, 8, 10 or 12 requests for the same URL by the same IP within 24 hours0. In some other examples, aberrant includes a comparatively high number of requests for different URLs from the same IP within a period of time. For example, these URLs (instances of URLs) can be located on different pages within a site hosted on a different domain, such as a social networking site.

Stated differently, a number of URLs can be located in an internet (e.g., the Internet), and reference one or more resources at a domain. When requests for those resources are received by virtue of "clicks" on the links, identifying information is obtained about the source(s) of the requests. By observing numbers of requests, patterns of requests for different links, and other such behavior for different requesters, an inference can be made as to whether a given requester is an Internet spider, rather than a person. In one application, a given URL is associated with a particular entity, such as a person, and that person is notified when the URL is used. However, usage of the URL (requests for the resource referenced by it) by spiders desirably should not trigger an alert, while requests from persons should trigger an alert. In one example, each URL references a pre-defined query determined for submission to a particular search engine, and where the entity is a person, the query can be a query tailored to return results relevant to that person. For example, the query can help disambiguate between similarly named people, to focus on a particular person. Other aspects include systems implementing such methods, and media storing instructions for such methods.

BRIEF DESCRIPTION OF THE DRAWINGS

Aspects according to this disclosure may be understood by reference to the following detailed description, which references the accompanying drawings, in which.

DESCRIPTION

As set forth above, an Internet site can have a number of pages that reference each other, or which otherwise have a browsable hierarchy or structure that makes page content available to those who browse to the site.

In one approach, a network-accessible resource has a number of resources that can be accessed (e.g., an Internet site can have a number of pages that each are referenced by a different URL). However, those pages or resources may be largely without references to each other, or be referenced by a page which would allow navigation to them.

For example, browsing to a top level domain of the site having the resources would not provide an index or other browsable structure, or otherwise contain linkages to or among those URLs. Therefore, a typical spider visiting such a site would not be presented with an expected browsable site. Such a site generally would be considered less useful for most applications or services than a typical approach to site construction, at least because users navigating to the home page would not be presented with the content available, or a way to navigate among the content. Such a structure is exemplary and not required, in that a content structure also can be provided, in addition to the structure described herein, as an example implementation.

In one approach, URLs referencing the content available at the domain are used on other domains that also can serve content, and themselves be visited by spiders. The presence of these URLs (instances of such URLs) on those different domains allows those URLs to be followed by spiders crawling links on those domains. When any of the URLs are followed, the spiders will request the resource identified by that URL from the domain. Where a plurality of such URLs are available on one or more other domains, multiple different URLs may be requested in a relatively short period of time.

In one example, each URL can reference a pre-defined query or profile for a person (or product, and so on), and that URL can be used on any number of other web pages to reference that pre-defined query. For example, such URLs can be used on social networking sites. If a number of different people have such URLs, then a spider crawling such a social network site will encounter, and follow a number of these different links. Similarly, a spider crawling a number of different web pages may encounter the same URL on a number of pages, and follow that URL repeatedly. For example, where a number of pages relate to a particular person, then a number of those pages may also have the URL referencing the pre-defined query for that person.

As such, the URLs referencing the same domain (or an interconnected/intercommunicating set of domains) can operate to attract spiders in such a way that their behavior can be viewed more globally than only what behavior they exhibit while crawling a single domain. In one implementation, the distribution of these URLs is accomplished by providing a capability for users to create search queries that are referenced by URLs, and then allowing those users to embed those URLs in a variety of web resources that they control. The following description provides further examples and other information concerning such implementations and approaches.

Figure 1:
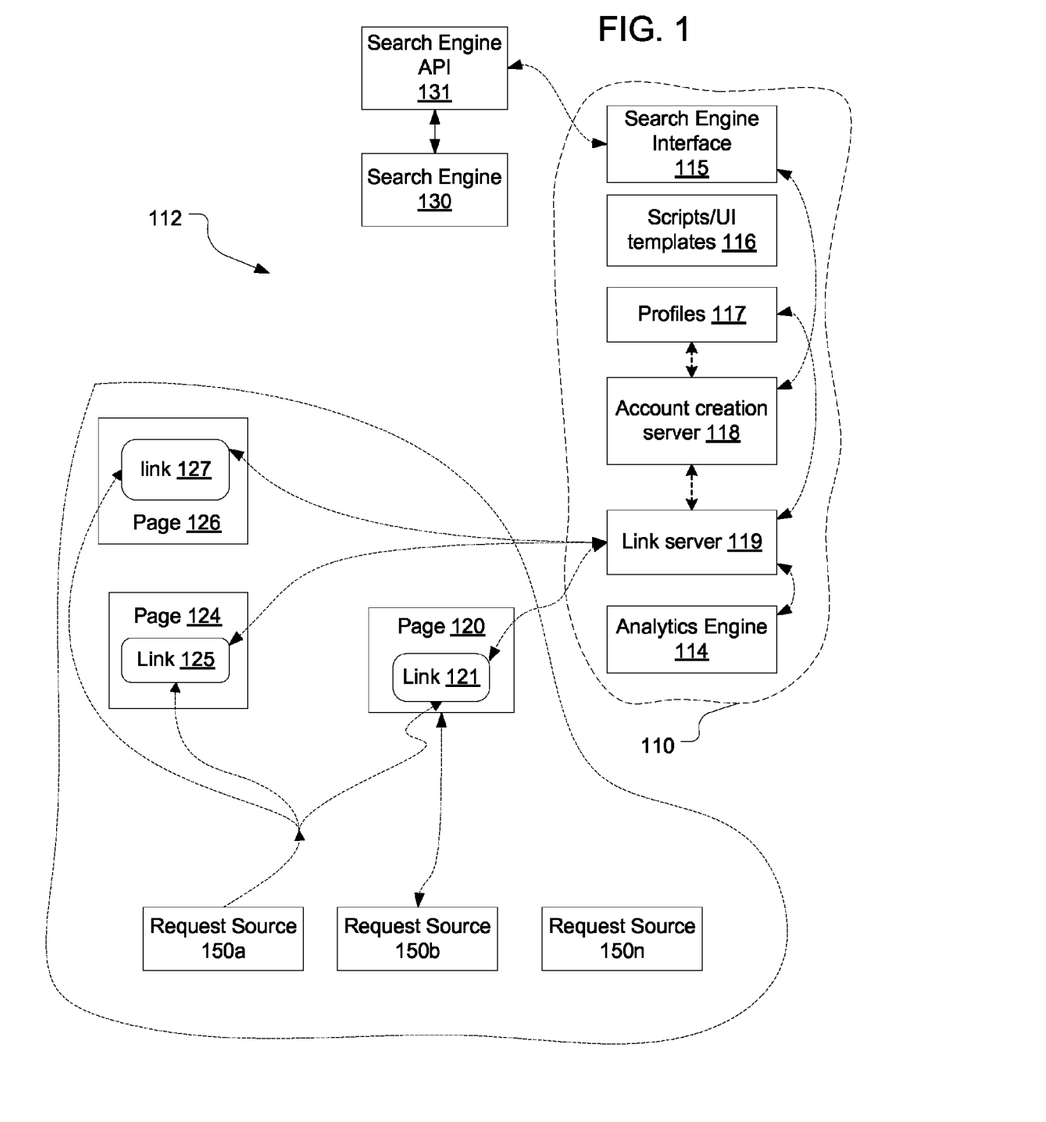
FIG. 1 depicts an arrangement of components and systems that will be referenced in describing aspects and examples according to the disclosure.

FIG. 1 depicts components of an internet-based example of a system in which aspects described herein can be practiced. Elements of the example depicted in FIG. 1 are introduced, followed by an overview of how the depicted system exemplifies the aspects of the disclosure.

FIG. 1 depicts an internet 112 (e.g., the Internet), through which a variety of components, described below, may communicate with each other. One functional grouping of components is search query provider 110.

Search query provider 110 can be used by an entity (e.g., a person) to obtain a definition of a search query. A link or referenced to the query definition can be distributed to third parties, for use in obtaining information about a particular subject (e.g., the person who created the pre-defined query, an organization, object, place, concept, product, service, event, or the like). Because the query is defined prior to the time that it is used, typically by an entity other than an entity that is intended to use the query to obtain the information, such a search query can be called a "pre-search query", in that it is defined before a time when it is used by a person or entity to search for the topic or subject matter defined by the query (e.g., the query can be defined by one party, and then distributed to another party that uses it).

In other words, the query is defined by a process performed prior to distribution of the query (or references to the query) for use in searching. Typically, the query is defined with a view to tailoring the results that are returned from the query to a desired subject, as will be described below. For example, the query can be formed during a process performed in a machine, which may interact with a person. In one example, the process can be performed to define a query that will return search results about a selected person, and in such a case, the person intended to be the subject of the query may perform the process. In another example, if the query is intended to be for a product, then a marketing employee of a company producing or selling the product may initiate or engage in the query formation process for that product. To be clear, a pre-search query is not confined to being used only for people. Therefore, creation of a pre-search query for a person, as in the principal examples herein is for ease and clarity of explanation, and not by way of limitation.

Returning to search query provider 110, an example composition of search query provider 110 includes a search engine interface 115, which interfaces with one or more search engines (a search engine 130 is depicted), such as through respective Application Programming Interfaces (APIs) provided by the search engines (an API 131 for search engine 130 is depicted). search query provider 110 also has a store of scripts (e.g., javascripts) and UI templates 116, which as will be described below are for use in configuring a user interface located at a browser, which can be used (in this example) for creating a pre-search query (such scripts also can be run on other devices, such as on server resources). An account creation server 118 also is provided for interfacing with the U, and can include information gathering functionality that can be implemented through the UI on the browser.

A link server 119 is provided to accept requests for a resource identified by a link (e.g., a link 121 made available on a web resource (e.g., a page) 120), which can be selected or otherwise activated by a request source 150b, which is accessing web resource 120. An analytics engine 114 communicates with link server 119, and operates to obtain and analyze information available from such linking activities. In a particular example, a pre-search query can be referenced by link 121, such that when link 121 is activated (e.g., by clicking on a visual depiction of the link, in a page served by web resource 120 to request source 150b), information about request source 150b, such as information about a browser at request source 150b, an IP address, operating system, and so on, can be obtained.

As will be described further below, various constituent elements of search query provider 110 communicate with each other, in order to perform query definition steps delineated in the examples that follow. For example, account creation server 118 can store profile information in profile storage (profiles 117). Also, account creation server 118 can update link information on link server 119 (e.g., to publish a new link that can be used or otherwise distributed). Similarly, account creation server 118 may communicate with search engine interface 115 for providing trial queries to be submitted to search engine 130, and to receive results returned responsive to those queries.

FIG. 1 depicts that a link referring to such a query can be distributed to a number of different locations (locations in the sense of being distinct electronically accessible resources in their own right—e.g., a web page at a first domain, and a web page at a second domain would be two different locations). These links are separately numbered as links 121, 125 and 127, and instances of those links can be disposed on any number of web resources, such as pages 120, 124, and 126, as depicted. The enumerated links 121, 125, and 127 can reference the same query or different queries, or can even point to resources other than such pre-defined queries. The links can point to resources on (accessible through) a single Internet domain or multiple domains, so long as servers at each domain can communicate information about requests for the resources referenced by the links, as described below.

Because a given URL can be replicated a number of times, and located on any number of different web properties, or domains, each replication of the URL also can be referred to as an instance of that URL. In one aspect, the distribution of a number of instances of a given URL on different resources within a domain, or across a number of different domains, can be followed by spiders to a domain referenced in those URL instances. For example, a social networking site can have a number of pages (resources) maintained by a number of distinct members of the site. Each member can have a URL referencing a resource on a first domain (other than the domain hosting the social networking site); for example, each member can have a URL referencing a pre-defined search query definition located on a resource at the first domain.

As such, the enumerated links 121, 125, and 126 exemplify a situation where a number of links (e.g., Uniform Resource Locations (URLs) are defined and distributed to a plurality of different locations on the Internet (or an internet). These URLs link to resources available at one or more domains that can collect or otherwise reference information about requests that are made for the resources referenced by the links. In a more particular example, each link 121, 125 and 126 can refer to a pre-defined search query created to produce search results for a person at a pre-selected search engine.

FIG. 1 thus depicts that a number of sources of requests (request source 150$a$ . . . 150$n$) can exist and make requests for the resources identified by the links 121, 125, and 127. These request sources 150$a$-150$n$ can be humans or spiders. In one aspect, the following disclosure is directed to approaches to distinguishing between requests made by humans and those made by spiders, and from that information, take different actions for humans than for spiders. Such different actions can depend on the application or applications being implemented using the links or the resources referenced by the links.

In one particular application, a person or entity can create a pre-search query using Internet-accessible pre-search query search query provider 110, which can assist in creating a search query for a particular search engine that returns results that emphasize a certain concept, topic, or are focused on a particular person, or otherwise disambiguate search results. For example, a person can create a pre-search query for himself, such that submitting that pre-search query to a search engine will return results available from the Internet that are relevant to that person, and which also can emphasize selected aspects of those results, and exclude confusingly similar names.

Continuing with this example application, a definition of a pre-search query stored at link server 119 can be referenced by a URL (e.g., any of links 121, 125, and 127). Activating such link can cause a redirection to the search engine, and the submission of the pre-search query to the search engine. In another example, usage of the link can return the linked definition, and a requester can submit the query definition to the search engine and obtain the results.

As may be discerned, pre-search queries can be created by an individual or an entity to allow others to be informed quickly and easily about a topic, product, person, or organization, for example. As such, the creator of a given pre-search query may be interested in understanding when and by whom the pre-search query has been used. For example, an e-mail or Short Message System (SMS) message may be sent to the creator of a given pre-search query, responsive to activation of a link to the query. However, if such a notification system is to be implemented, creators of such pre-search queries may desire not to be notified when Internet spiders request the pre-search query while crawling a page on which a link to the query appears. Therefore, an approach to disambiguating between requests by humans or other entities of interest, and spiders can be useful.

To summarize, the links 121, 125, and 127 represent what could be hundreds, thousands, tens, or even hundreds of thousands of instances of the same link, and different links. For example, a number of instances of a link pointing to one pre-search query can be found at different locations on the Internet, even as a number of links pointing to other pre-search queries also can be found on the Internet. For example, a user can have a Facebook page and a LinkedIn page, on which instances of the same URL appear. Similarly, there are a number of users of Facebook and LinkedIn; each may have a distinct URL pointing to their respective pre-search query.

The following disclosure relates to example approaches to differentiating between spiders and requests that would generally be considered by most users to be more interesting (e.g., requests initiated by humans, and not spiders).

Figure 2:
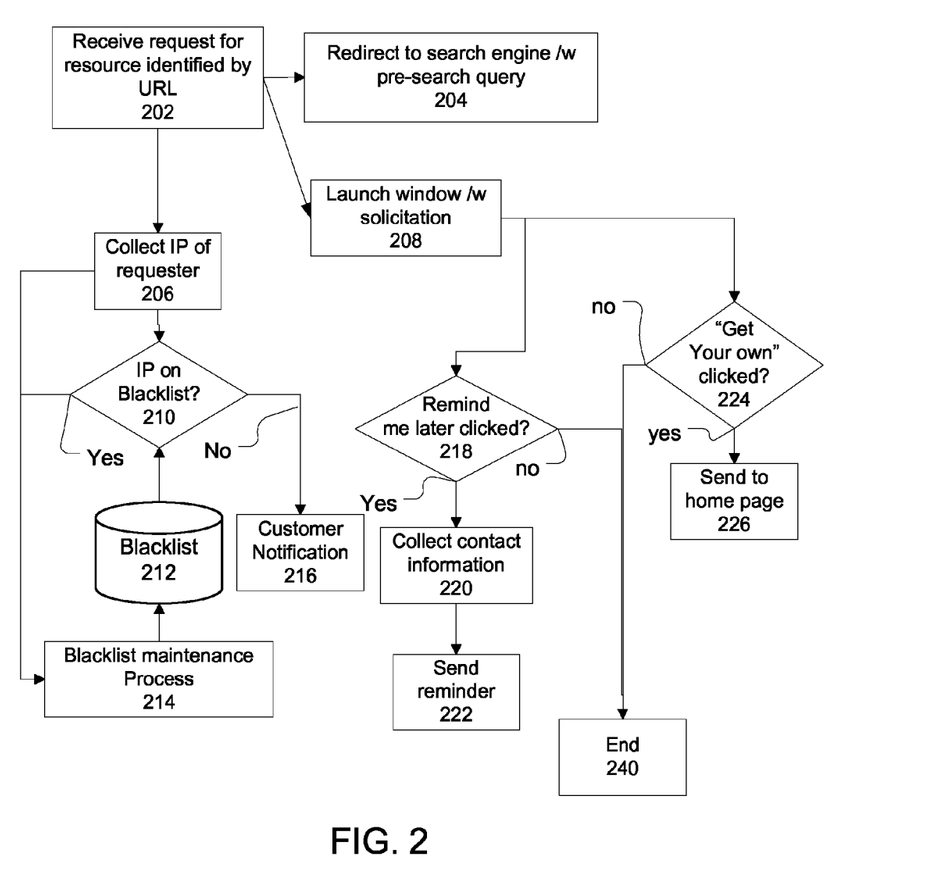
FIG. 2 depicts an example method in which spider behavior can be detected, and link requests can be responsively served.
Figure 4:
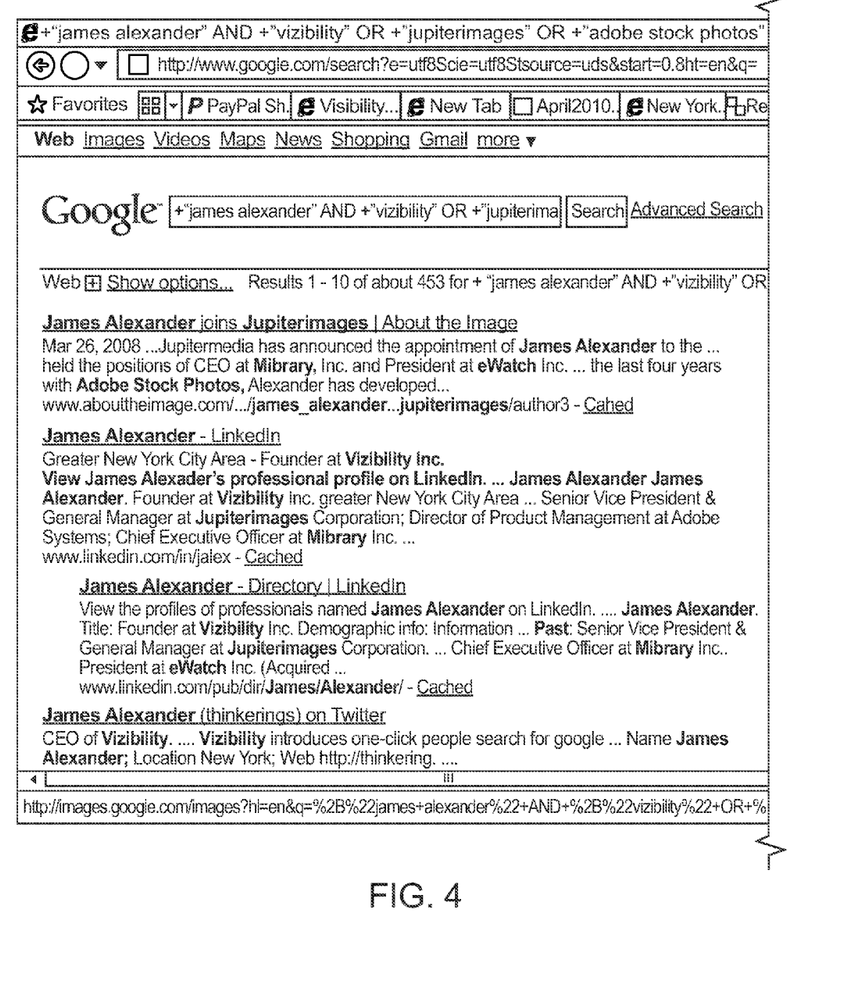
FIGS. 4 and 5 depict examples of interface elements that can be used in practicing the method of FIG. 2.
Figure 5:
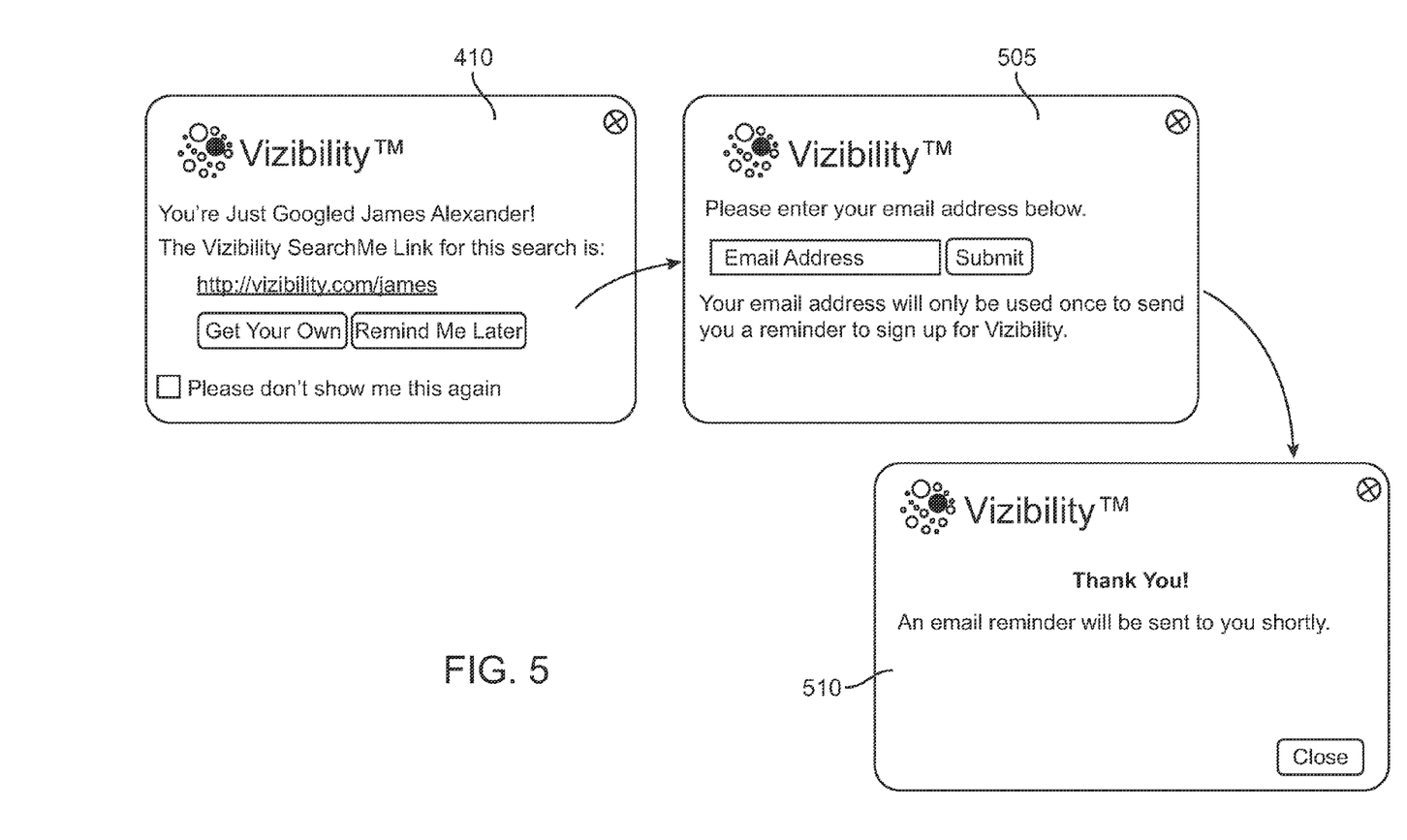

FIG. 2 depicts a first method by which requests for resources identified/linked to a particular URL are received (202). Responsively, the request is redirected (204) to the search engine (can be a pre-defined search engine that was used in creating the linked pre-search query), and a solicitation window can be launched (208). In addition to the aspects relating to spider detection, other aspects relate to other aspects of serving pre-defined queries to requesters. In particular, when a requester navigates to a resource (from an instance of a link to the resource), an invitation to obtain a pre-defined query also can be launched in the context of (or while) redirecting to a search engine which will serve results of the pre-defined query search. FIGS. 4 and 5 thus present examples of how a solicitation to obtain such a pre-defined search query can be conducted.

Considering some aspects of FIG. 2 in the context of FIGS. 4 and 5, an example solicitation window 410 is depicted in FIG. 4, within a context of a web page 405 displaying results returned from the search engine responsive to the redirect (204). FIG. 5 depicts a flow beginning from the display of solicitation window 410, which includes a solicitation for contact information (505), and a conclusion window (510). Solicitation window 410 depicted in FIG. 4 allows a selection of a Get Your Own pre-search query button 412, or selection of a Remind Me Later button 415. A selection of Remind Me Later button 415 is detected (218), and responsive to that detection, the solicitation of contact information window (505) appears, in order to effect a collection (220) of contact information. A reminder to sign up is sent (222) at a subsequent time, which can be scheduled in some embodiments. Selection of Get Your Own button 412 is detected at 224, and responsively, the user is redirected (226) to a home page or another location where a process can be conducted to obtain such pre-search query. If the user did not select either Remind Me Later button 415 or Get Your Own button 412, then the process can end (240).

Returning to FIG. 2, an IP (or equivalent address) of the requester can be collected (206), and used in determining (210) whether the requester is on a blacklist that identifies spiders. If the IP address does not match to an entry in a blacklist database (212), then a customer notification procedure (216) can be commenced. If the IP is on the blacklist, then a blacklist maintenance process (214) can be invoked. Aspects of maintenance process (214) will be described in more detail below. It is to be understood that disclosure of using Internet Protocol (IP) is exemplary of an address layer protocol, and more generally still an example of information that can be used to identify a source of a request. Similarly, the Internet is used as an example of a collection of networks which can be used for carrying communications furthering these examples) can be collected (206) (if using an addressing protocol other than IP, equivalent address information for the request can be gathered, or more generally, other identifying information for the requester that may be available).

Figure 3:
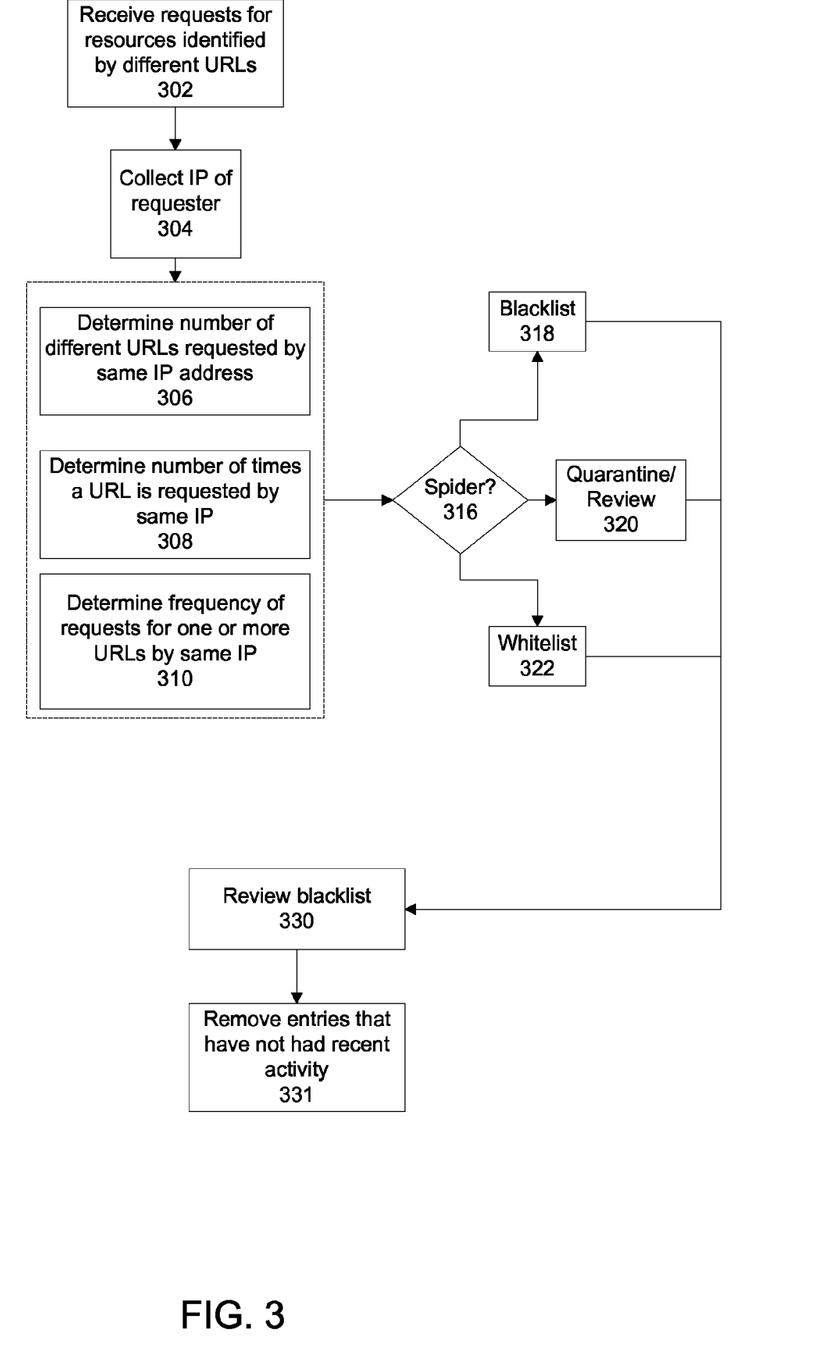
FIG. 3 depicts an example approach to maintaining a list of internet spiders that can be used as an input to the method of FIG. 2.

Now turning to FIG. 3, an example of a blacklist maintenance process (214) is depicted, and described below. As described with respect to FIG. 2, requests for resources identified by different URLs (one example is multiple URLs, but some aspects herein also can be practiced based on requests for a single URL) can be received (302), and address information for the requesters is collected (304). A group of data gathering elements can be implemented, for example, a determination (306) of a number of different URLs that are requested by the same IP can be made.

Additionally, a determination (308) of a number of times a URL is requested by the same IP also can be made. Still further, a frequency of requests for one or more URL instances by the same IP can be determined (310). For example, a requester can cycle through a number of URLs at an abnormally rapid pace, while a person may also select a number of different URL's but at a slower pace. By particular example, a recruiter firm may have a limited number of IP addresses, and requests sourced from the firm may by simple numerosity be indicative of a spider, but a pattern of the requests may indicate differently. Also, request patterns and behavior of some requesters can be compared with that of other requesters, in order to gather information about whether a given IP address is used by a spider.

With information gathered, a determination as to whether a given IP address is used by a spider is made (316). The determination can be a trinary decision, where the request behavior indicates a strong likelihood that the IP is used by a spider, and that decision can result in blacklisting (318), while if the behavior is suspicious but not strongly correlated with spider behavior, the IP can be placed on a watch list for review (320), and if the behavior does not appear correlated with spider-type behavior, then the IP address can be added to a whitelist 322. Whitelist 322 also can be maintained by manual review. For example, certain entities may source an abnormally high number of requests from persons, or otherwise generate requests that are of interest to owners of the URLs. As such, it remains desirable to inform the owners when such requests are made. Therefore, known entities with these characteristics can be added to the whitelist. For example, employment agencies and recruiters can be added to the whitelist, and such manually added entries would take precedence over the automatic analysis, in most situations. Further, the whitelist can be consulted for a given IP prior to determination (316), in some implementations.

However, it may remain desirable to perform determinations according to the exemplary determinations 306, 308, and 310 regardless whether a requester IP is on the whitelist or not. For example, IP addresses may end up being used by different entities over time, such that it may be desirable to watch for changes in behavior that may require review (320) to be conducted again (or blacklisting to be considered again). In some examples, three requests by the same IP address on the same URL (from any number of instances of that URL) causes determination (316) to flag the IP address for review (320) (which also can be viewed as a quarantine list), while 8 clicks in 24 hours causes the IP address to be blacklisted (318). Similarly, the same IP address requesting 20 different links with a relatively small period of time, for example, 24 hours, or 12 hours triggers review or quarantining (320), and if 30 more requests originate from that IP within a follow on period of time, then the IP is blacklisted (318). By further example, 40 or 50 requests for any combination of URL instances would result in blacklisting (318). The concept is extensible to IP address ranges that have common ownership, or another reason why their behavior appears to be a federated or distributed spidering system. By having a larger number of links in the system, many of which may be concentrated on different pages of social networking sites, a large amount of request information can be collected and used to determine whether a given IP address is being used for crawling/spidering.

Further, a blacklist review process can be conducted (330), such as on a schedule. In one example, the blacklist is reviewed, and entries that have not had recent activity are removed (331) from the blacklist In one approach, if spidering activity is not observed for a period of time (e.g., 3 days, 5 days, 10 days), for an IP address on the blacklist, that IP can be moved to a quarantine list, and after a further period of time elapses (e.g., 3 days, 5 days, 10 days), the IP can be removed from the quarantine. Thus, the lists can be more dynamic than typical static lists of IP addresses from which spidering activity was once detected. Preferably, however, spiders are added to the quarantine and blacklists quicker than they are removed.

In some aspects, an API can be provided by which an entity, such as a third party can request information about whether a given IP address is considered a spider. A list also can be published with such information.

Figure 6:
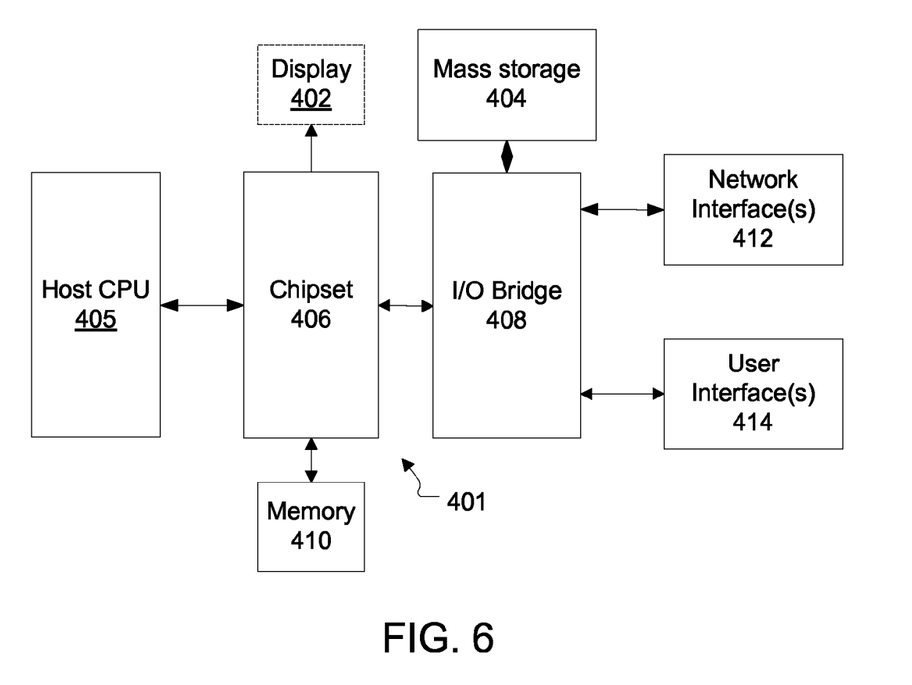
FIG. 6 depicts an example system to be used in implementing components and systems according to FIG. 1.

FIG. 6 depicts an example of a computer system 600 that can be used to implement described structural elements, such as the structural elements depicted in FIG. 1. By particular example, a computer system according to the example computer system 600 can be used in executing browsers 126 and 125, a number of such systems 600 can be employed at search engine 130, as well as at search query search query provider 110.

Example computer system 600 may include a host Central Processing Unit (CPU) (602), which may be implemented as a semiconductor containing one or more distinct microprocessor units, commonly called "cores", to indicate distinctness, but yet integration on a common substrate. Modern processors typically comprise multiple cores, such as 2, 4, 6, 8, 12 or more cores. Host CPU 602 also can be implemented with a plurality of physically separate microprocessor units, disposed in separate sockets. Host CPU 602 communicates with a chipset 604, which typically includes memory bus logic, and other interfaces to other functionality, such as an expansion bus for supporting I/O, such as network traffic to and from network interface(s) 614, mass storage 618 (e.g., hard drives), as well as peripherals, such as those that can be provided for a user interface (616). Example of such peripherals include a keyboard, serial I/O, a mouse, voice recognition inputs, touch screen inputs, and so on.

Chipset 604 also may support connection of a display 610, and therefore may include graphics logic for rendering content to be displayed. Such graphics logic may use main memory 608 as video memory, or a separate video memory may be provided. Where system 600 is used for implementing end-user computers, a display is more likely to be included. Frequently, if system 600 is functioning as a server, a display would not be provided.

Of course, the example system 600 is provided by way of example and not limitation as to what kinds of devices may be used in implementing aspects disclosed herein. Those of ordinary skill in the art may adapt the disclosures presented herein for use with a variety of devices, such as smartphones, tablet computers, laptops, and so on, which may be implemented using components that are more or less integrated than those depicted herein, and which may include more functionality or fewer functions than what is depicted in this example.

The separate identification of these components does not imply that the components are implemented separately. Also, the usage of certain programming techniques and paradigms are by way of example, rather than limitation, and a person of ordinary skill in the art can provide equivalent approaches in providing embodiments according to these disclosures.

Although illustrated embodiments of the present invention has been described, it should be understood that various changes, substitutions, and alterations can be made by one of ordinary skill in the art without departing from the scope of these disclosures.

What is claimed is:

1. A method for implementation on one or more computers, comprising:

accepting, at one or more of the one or more computers, requests for resources, each resource identified by a respective URL resolvable to a common domain;

collecting, at one or more of the one or more computers, identifying information for entities making the requests;

comparing, at one or more of the one or more computers, the identifying information for the entities making the requests; and categorizing, at one or more of the one or more computers, one or more of the entities as a web crawler, based on determining whether at least a threshold number of requests for the identical URL were made from a single entity within a time limit, and responsive to the determining returning an affirmative result, categorizing the entity that made those requests as a web crawler.

2. The computer-implemented method of claim 1, wherein, for an entity requesting resources, but not categorized as a web crawler, serving, from one or more of the one or more computers, the resource identified by the URL requested by that entity, and notifying a contact associated with the resource of the request.

* * * * *